United States Patent
Lien et al.

(10) Patent No.: US 12,184,395 B2
(45) Date of Patent: Dec. 31, 2024

(54) SATELLITE COMMUNICATION SYSTEM AND METHOD FOR MANAGING RADIO RESOURCE OF NON-TERRESTRIAL NETWORK

(71) Applicant: Industrial Technology Research Institute, Hsinchu (TW)

(72) Inventors: Shao-Yu Lien, Tainan (TW); Bai-Chuan Chang, New Taipei (TW); Ching-Chun Chou, Taipei (TW); Hua-Lung Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 552 days.

(21) Appl. No.: 17/562,030

(22) Filed: Dec. 27, 2021

(65) Prior Publication Data

US 2023/0170987 A1 Jun. 1, 2023

(30) Foreign Application Priority Data

Nov. 30, 2021 (TW) ................. 110144568

(51) Int. Cl.
*H04B 7/185* (2006.01)
*H04W 72/1263* (2023.01)
(Continued)

(52) U.S. Cl.
CPC ..... *H04B 7/18521* (2013.01); *H04B 7/18539* (2013.01); *H04W 72/1263* (2013.01); *H04W 72/56* (2023.01); *H04W 84/06* (2013.01)

(58) Field of Classification Search
CPC ............ H04B 7/18521; H04B 7/18539; H04B 7/1851; H04B 7/18513; H04B 7/18517;
(Continued)

(56) References Cited

U.S. PATENT DOCUMENTS

| 6,512,920 B1 | 1/2003 | Yaoya |
| 10,998,965 B2 | 5/2021 | Tong et al. |

(Continued)

FOREIGN PATENT DOCUMENTS

| CN | 111727658 | 9/2020 |
| CN | 112532298 | 3/2021 |

(Continued)

OTHER PUBLICATIONS

"Office Action of Taiwan Counterpart Application", issued on May 30, 2022, p. 1-p. 12.

(Continued)

*Primary Examiner* — Ashley Shivers
(74) *Attorney, Agent, or Firm* — JCIPRNET

(57) ABSTRACT

A satellite communication system and a method for managing radio resource of a non-terrestrial network are provided. The method includes: transmitting, by a first satellite, a first resource scheduling assignment when leaving a service area of the non-terrestrial network; receiving, by a second satellite, a second resource scheduling assignment corresponding to the first scheduling assignment when entering the service area; and accessing, by the second satellite, the radio resource according to the second resource scheduling assignment.

32 Claims, 12 Drawing Sheets

(51) Int. Cl.
*H04W 72/56* (2023.01)
*H04W 84/06* (2009.01)

(58) Field of Classification Search
CPC .. H04W 72/1263; H04W 72/56; H04W 84/06
See application file for complete search history.

(56) References Cited

U.S. PATENT DOCUMENTS

| | | | |
|---|---|---|---|
| 11,115,114 | B2 | 9/2021 | Treesh |
| 11,336,364 | B1 * | 5/2022 | Masoomzadeh .... H04W 64/006 |
| 2002/0077099 | A1 | 6/2002 | LaPrade |
| 2020/0014460 | A1 | 1/2020 | Tong et al. |
| 2021/0058145 | A1 | 2/2021 | Alasti et al. |
| 2021/0075501 | A1 | 3/2021 | Xu et al. |
| 2021/0092640 | A1 | 3/2021 | Ravishankar et al. |
| 2021/0105761 | A1 | 4/2021 | Cheng et al. |
| 2021/0119697 | A1 | 4/2021 | Wang et al. |
| 2021/0144539 | A1 | 5/2021 | Edge et al. |
| 2021/0219241 | A1 | 7/2021 | Wang et al. |
| 2022/0174610 | A1 * | 6/2022 | Qiao .................. H04W 52/146 |
| 2023/0370154 | A1 * | 11/2023 | Ciochina .............. H04B 7/2041 |
| 2024/0031011 | A1 * | 1/2024 | Zhu ................... H04B 7/18539 |

FOREIGN PATENT DOCUMENTS

| | | |
|---|---|---|
| JP | 2001025050 | 1/2001 |
| KR | 20210056392 | 5/2021 |
| RU | 2108672 | 4/1998 |
| TW | 202116023 | 4/2021 |
| WO | 2020034333 | 2/2020 |
| WO | 2020222203 | 11/2020 |
| WO | 2020244563 | 12/2020 |
| WO | 2021034922 | 2/2021 |
| WO | 2021058111 | 4/2021 |
| WO | 2021063395 | 4/2021 |

OTHER PUBLICATIONS

"Search Report of Europe Counterpart Application", issued on Jun. 13, 2022, p. 1-p. 10.
Asustek, "PLMN separation for NTN & TN", 3GPP TSG-RAN WG2 Meeting #113 electronic, R2-2101755, Jan. 25-Feb. 5, 2021, pp. 1-3.
"Office Action of Taiwan Counterpart Application", issued on Feb. 17, 2023, p. 1-p. 13.
F. Rinaldi et al., "Cooperative Resource Allocation in Integrated Terrestrial/Non-Terrestrial 5G and Beyond Networks", GLOBECOM 2020—2020 IEEE Global Communications Conference, Dec. 7-11, 2020, pp. 1-6.
Jonas Sedin et al., "Throughput and Capacity Evaluation of 5G New Radio Non-Terrestrial Networks with LEO Satellites", GLOBECOM 2020—2020 IEEE Global Communications Conference, Dec. 7-11, 2020, pp. 1-6.
Matteo Conti et al., "NB-IoT over Non-Terrestrial Networks:Link Budget Analysis", GLOBECOM 2020—2020 IEEE Global Communications Conference, Dec. 7-11, 2020, pp. 1-6.
Syed Maaz Shahid et al., "Load Balancing for 5G integrated Satellite-Terrestrial Networks", IEEE Access, vol. 3, Jul. 2020, pp. 132144-132156.
Yang Cao et al., "Deep Reinforcement Learning for Multi-User Access Control in Non-Terrestrial Networks", IEEE Transactions on Communications, vol. 69, Issue 3, Mar. 2021, pp. 1605-1619.
"Office Action of China Counterpart Application", issued on Jul. 26, 2024, p. 1-p. 8.

* cited by examiner

SATELLITE COMMUNICATION SYSTEM AND METHOD FOR MANAGING RADIO RESOURCE OF NON-TERRESTRIAL NETWORK

CROSS-REFERENCE TO RELATED APPLICATION

This application claims the priority benefit of Taiwan application serial no. 110144568, filed on Nov. 30, 2021. The entirety of the above-mentioned patent application is hereby incorporated by reference herein and made a part of this specification.

TECHNICAL FIELD

The disclosure relates to a method for managing radio resources, and particularly relates to a satellite, ground station, satellite communication system and method for managing radio resources of non-terrestrial networks.

BACKGROUND

The non-terrestrial network (NTN) family includes high altitude platform (HAP), low altitude platform (LAP), low earth orbit (LEO) satellite, very low earth orbit (vLEO) satellite, medium earth orbit (MEO) satellite, and geosynchronous equatorial orbit (GEO) satellite, among which LEO (or vLEO) satellite has a speed that can reach as high as 7.4 km/s.

LEO satellite can be used to forward data between ground stations. FIG. 1 shows a schematic diagram of LEO satellites and ground stations. LEO satellite 2 can receive signals from a ground station 1, and forward the received signals to a ground station 3. The ground station 1 (or ground station 3) and LEO satellite 2 can perform data transmission through the L2 layer or the physical layer.

The LEO satellite 2 can provide services in a transparent mode or a regenerative mode. The LEO satellite 2 in the transparent mode can amplify the received signal and forward the amplified signal to the ground station 3. The LEO satellite 2 in regenerative mode can perform network management or network resource assignment to achieve complex quality of service (QoS) network service requirements. For example, the LEO satellite 2 can perform down-converting on the signal received from the ground station 1 to convert the signal to an intermediate frequency. Then, the LEO satellite 2 can perform demodulation on the received signal to convert the signal to a baseband. After performing signal processing on the baseband signal, the LEO satellite 2 can modulate the processed signal to the downlink carrier, and perform up-converting on the signal and amplify the signal. Then, the LEO satellite 2 can forward the signal to the ground station 3.

In order to provide seamless services for ground station of the LEO network, a constellation formed by multiple LEO satellites is required. A constellation is a group of satellites that work together as a system. Multiple LEO satellites can form a constellation based on object parameters such as orbit, inclination, or altitude, or can form a constellation based on software parameters such as the type of service provided by the satellite or satellite identifier.

In order to perform radio resource assignment for multiple satellites, LEO satellite can install a payload that includes a radio resource scheduler. The radio resource scheduler can assign radio resources for all devices in the coverage of the service link beam or feeder link beam. Radio resources may include space domain/frequency domain/code domain resources, link adaptation scheme or beam information, etc. The link adaptation scheme can be associated with modulation, channel coding, transmission power, reference signal or retransmission scheme, and the retransmission scheme is, for example, number/resources of transmission repetitions or number/resources of retransmission. However, the computing power of the radio resource scheduler is limited. In the condition of limited time, the above work will bring a heavy burden to the radio resource scheduler. FIG. 2 shows a schematic diagram of a LEO satellite in motion. The LEO satellite 2 can move from service area A to service area B in just 9 minutes. Therefore, the radio resource scheduler needs to complete the radio resource scheduling within 9 minutes. The power of the LEO satellite 2 can provide a support up to 1800 watts, of which at least 1200 watts are provided to the radio frequency module, at least 45 watts are provided to the payload computer, and at least 300 watts are provided to the BB (Baseband) module and the L2 module. In other words, ordinary communication work needs to consume 1545 watts of power. When fully loaded, the power consumption of the LEO satellite 2 may rise to nearly 1800 watts. In this case, it is very difficult for the LEO satellite 2 to complete the radio resource scheduling within 9 minutes.

Accordingly, how to provide an efficient radio resource scheduling method is one of the goals that practitioners in the art are committed to achieve.

SUMMARY

The disclosure provides a satellite, ground station, satellite communication system and method for managing radio resources of non-terrestrial networks, which can efficiently perform radio resource scheduling.

In the disclosure, the method for managing radio resources of a non-terrestrial network is adapted for satellites, and the method includes: receiving a first resource scheduling assignment from a second satellite in response to entering a service area of the non-terrestrial network; and accessing radio resources according to the first resource scheduling assignment.

In an embodiment of the disclosure, the step of receiving the first resource scheduling assignment from the second satellite in response to entering the service area of the non-terrestrial network includes: receiving the first resource scheduling assignment from the second satellite through the ground station.

In an embodiment of the disclosure, the step of receiving the first resource scheduling assignment from the second satellite in response to entering the service area of the non-terrestrial network includes: detecting whether the inter-satellite link (ISL) is present; and receiving the first resource scheduling assignment directly from the second satellite in response to the presence of the ISL.

In an embodiment of the disclosure, the step of receiving the first resource scheduling assignment from the second satellite in response to entering the service area of the non-terrestrial network further includes: detecting whether the ISL is present; and receiving the first resource scheduling assignment through the ground station in response to the absence of the ISL.

In an embodiment of the disclosure, the method further includes: transmitting the second resource scheduling assignment to the third satellite in response to leaving the service area.

In an embodiment of the disclosure, the method further includes: determining the second resource scheduling assignment according to the first resource scheduling assignment.

In an embodiment of the disclosure, the step of transmitting the second resource scheduling assignment to the third satellite in response to leaving the service area includes: detecting whether the ISL is present; and directly transmitting the second resource scheduling assignment to the third satellite in response to the presence of the ISL.

In an embodiment of the disclosure, the step of transmitting the second resource scheduling assignment to the third satellite in response to leaving the service area further includes: transmitting the second resource scheduling assignment to the third satellite through the ground station in response to the absence of the ISL.

In an embodiment of the disclosure, the step of accessing radio resources according to the first resource scheduling assignment includes: determining the first priority of the first resource scheduling assignment and at least one priority of the at least one resource scheduling assignment; and selecting the first resource scheduling assignment to access the radio resource in response to the first priority being higher than the at least one priority.

In an embodiment of the disclosure, the first priority is associated with at least one of the following: satellite specifications, measurement results of service quality, radio resource scheduling in the time domain, radio resource scheduling in the frequency domain, or radio resource scheduling in the space domain.

In an embodiment of the disclosure, the method further includes: measuring network parameters corresponding to the service area; and generating at least one resource scheduling assignment according to the network parameters.

In an embodiment of the disclosure, the first resource scheduling assignment includes at least one of the following: radio resource scheduling, traffic scheduling, or service resource control.

In the disclosure, the method for managing radio resources of a non-terrestrial network is adaptable for a ground station, and the method includes: receiving a first resource scheduling assignment from a first satellite which leaves a service area of the non-terrestrial network; and transmitting the second resource scheduling assignment to the second satellite which enters the service area according to the first resource scheduling assignment.

In an embodiment of the disclosure, the second resource scheduling assignment is the same as the first resource scheduling assignment, and the step of transmitting the second resource scheduling assignment to the second satellite which enters the service area according to the first resource scheduling assignment includes: determining the first priority of the second resource scheduling assignment and at least one priority of the at least one resource scheduling assignment; and selecting to transmit the second resource scheduling assignment to the second satellite in response to the first priority being higher than the at least one priority.

In an embodiment of the disclosure, the second resource scheduling assignment is different from the first resource scheduling assignment, and the step of transmitting the second resource scheduling assignment to the second satellite which enters the service area according to the first resource scheduling assignment includes: determining a first priority of the second resource scheduling assignment and at least one priority of the at least one resource scheduling assignment, and the at least one resource scheduling assignment includes the first resource scheduling assignment; and selecting to transmit the second resource scheduling assignment to the second satellite in response to the first priority being higher than the at least one priority.

In an embodiment of the disclosure, the first priority is associated with at least one of the following: satellite specifications, measurement results of service quality, radio resource scheduling in the time domain, radio resource scheduling in the frequency domain, or radio resource scheduling in the space domain.

In an embodiment of the disclosure, the method further includes: measuring network parameters corresponding to the service area; and generating the at least one resource scheduling assignment according to the network parameters.

In an embodiment of the disclosure, the second resource scheduling assignment includes at least one of the following: radio resource scheduling, traffic scheduling, or service resource control.

In the disclosure, the method for managing radio resources of a non-terrestrial network is adaptable for a satellite communication system, and the satellite communication system includes a first satellite and a second satellite, and the method includes: transmitting the first resource scheduling assignment by the first satellite when leaving the service area of the non-terrestrial network; receiving the second resource scheduling assignment corresponding to the first resource scheduling assignment when the second satellite enters the service area; and accessing radio resources by the second satellite according to the second resource scheduling assignment.

In an embodiment of the disclosure, the step of receiving the second resource scheduling assignment corresponding to the first resource scheduling assignment by the second satellite when entering the service area includes: detecting whether the ISL is present by the second satellite; and receiving the second resource scheduling assignment directly from the first satellite by the second satellite in response to the presence of the ISL, and the second resource scheduling assignment is the same as the first resource scheduling assignment.

In an embodiment of the disclosure, the step of receiving the second resource scheduling assignment corresponding to the first resource scheduling assignment by the second satellite when entering the service area further includes: receiving the second resource scheduling assignment from the ground station by the second satellite in response to the absence of the ISL.

In an embodiment of the disclosure, the step of accessing radio resources by the second satellite according to the second resource scheduling assignment includes: determining, by the second satellite, the first priority of the second resource scheduling assignment and the at least one priority of the at least one resource scheduling assignment; and selecting, by the second satellite, the second resource scheduling assignment to access the radio resources in response to the first priority being higher than the at least one priority.

In an embodiment of the disclosure, the first priority is associated with at least one of the following: satellite specifications, measurement results of service quality, radio resource scheduling in the time domain, radio resource scheduling in the frequency domain, or radio resource scheduling in the space domain.

In an embodiment of the disclosure, the method further includes: measuring network parameters of the service area by the second satellite; and generating at least one resource scheduling assignment by the second satellite according to the network parameters.

In an embodiment of the disclosure, the method further includes: receiving a first resource scheduling assignment from the first satellite by the ground station; and transmitting the second resource scheduling assignment to the second satellite by the ground station in response to receiving the first resource scheduling assignment.

In an embodiment of the disclosure, the second resource scheduling assignment is the same as the first resource scheduling assignment, and the step of transmitting the second resource scheduling assignment to the second satellite by the ground station in response to receiving the first resource scheduling assignment includes: determining, by the ground station, the first priority of the second resource scheduling assignment and the at least one priority of the at least one resource scheduling assignment; and selecting, by the ground station, to transmit the second resource scheduling assignment to the second satellite in response to the first priority being higher than at least one priority.

In an embodiment of the disclosure, the second resource scheduling assignment is different from the first resource scheduling assignment, and the step of transmitting, by the ground station, the second resource scheduling assignment to the second satellite in response to receiving the first resource scheduling assignment includes determining, by the ground station, the first priority of the second resource scheduling assignment and the at least one priority of the at least one resource scheduling assignment, and the at least one resource scheduling assignment includes the first resource scheduling assignment; and selecting, by the ground station, to transmit the second resource scheduling assignment to the second satellite in response to the first priority being higher than at least one priority.

In an embodiment of the disclosure, the method further includes: measuring network parameters of the service area by the ground station; and generating the at least one resource scheduling assignment by the ground station according to the network parameters.

In an embodiment of the disclosure, the second resource scheduling assignment includes at least one of the following: radio resource scheduling, traffic scheduling, or service resource control.

In the disclosure, a satellite for managing radio resources of a non-terrestrial network includes a transceiver and a processor. The processor is coupled to the transceiver, and the processor is configured to perform: receiving a first resource scheduling assignment from a second satellite through the transceiver in response to entering a service area of the non-terrestrial network; and accessing radio resources through the transceiver according to the first resource scheduling assignment.

In the disclosure, a ground station for managing radio resources of a non-terrestrial network includes a transceiver and a processor. The processor is coupled to the transceiver, and the processor is configured to perform: receiving, through the transceiver, the first resource scheduling assignment from the first satellite which leaves the service area of the non-terrestrial network; and transmitting, through the transceiver, the second resource scheduling assignment to the second satellite which enters the service area according to the first resource scheduling assignment.

In the disclosure, a satellite communication system for managing radio resources of a non-terrestrial network includes a first satellite and a second satellite. The first satellite transmits the first resource scheduling assignment when leaving the service area of the non-terrestrial network. The second satellite is communicatively connected to the first satellite, and the second satellite receives a second resource scheduling assignment corresponding to the first resource scheduling assignment when entering the service area, and accesses radio resources according to the second resource scheduling assignment.

Based on the above, the satellite communication system of the disclosure can transmit the resource scheduling assignment of the satellite that is about to leave the service area to another satellite that is about to enter the service area. Satellites entering the service area late can access radio resources according to the existing resource scheduling assignment. In this way, the computational burden of the satellite can be reduced and the operating efficiency of the satellite can be improved.

DETAILED DESCRIPTION OF DISCLOSED EMBODIMENTS

In order to reduce the computational burden of various satellites in the constellation system and efficiently use radio resources, this disclosure provides a satellite communication system. Satellites in the satellite communication system can obtain resource scheduling assignment from other satellites or ground stations.

Figure 1:
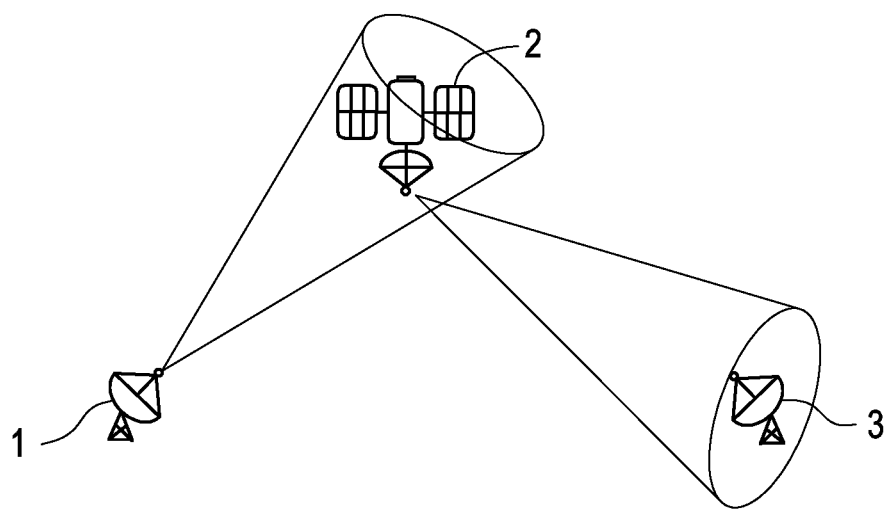
FIG. 1 is a schematic diagram of a LEO satellite and a ground station.
Figure 2:
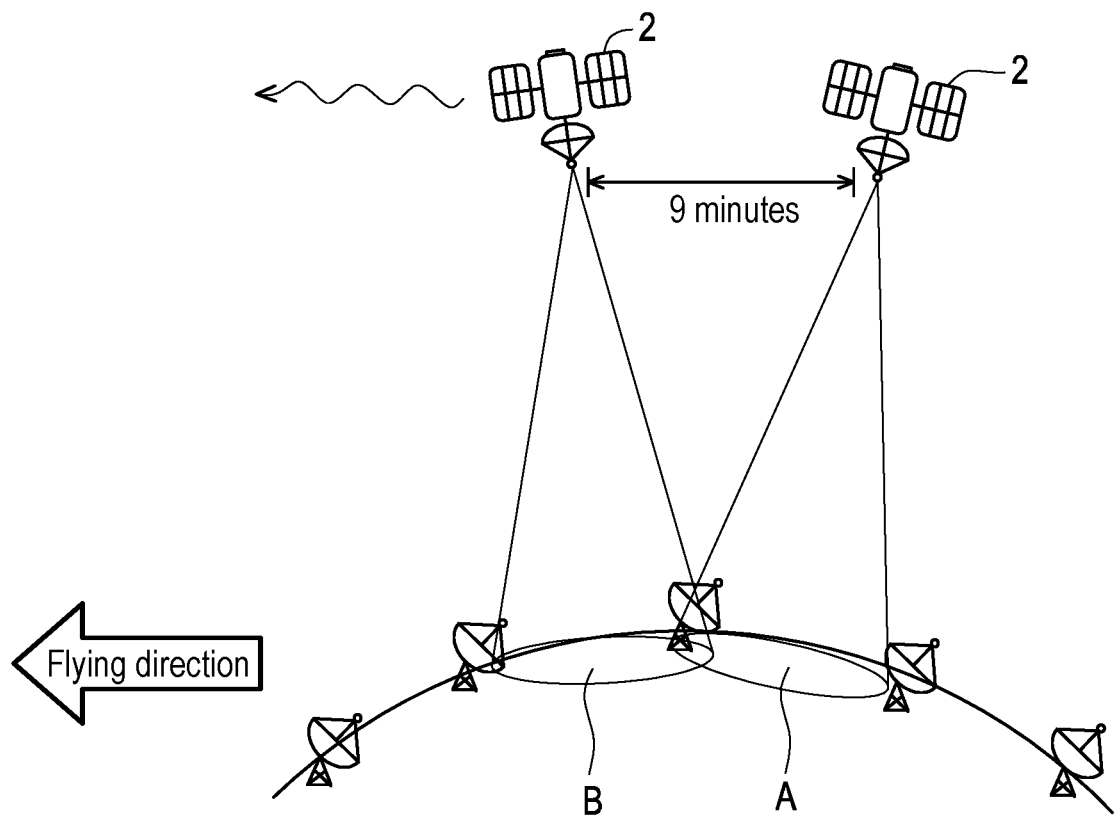
FIG. 2 is a schematic diagram of a LEO satellite in motion.
Figure 3:
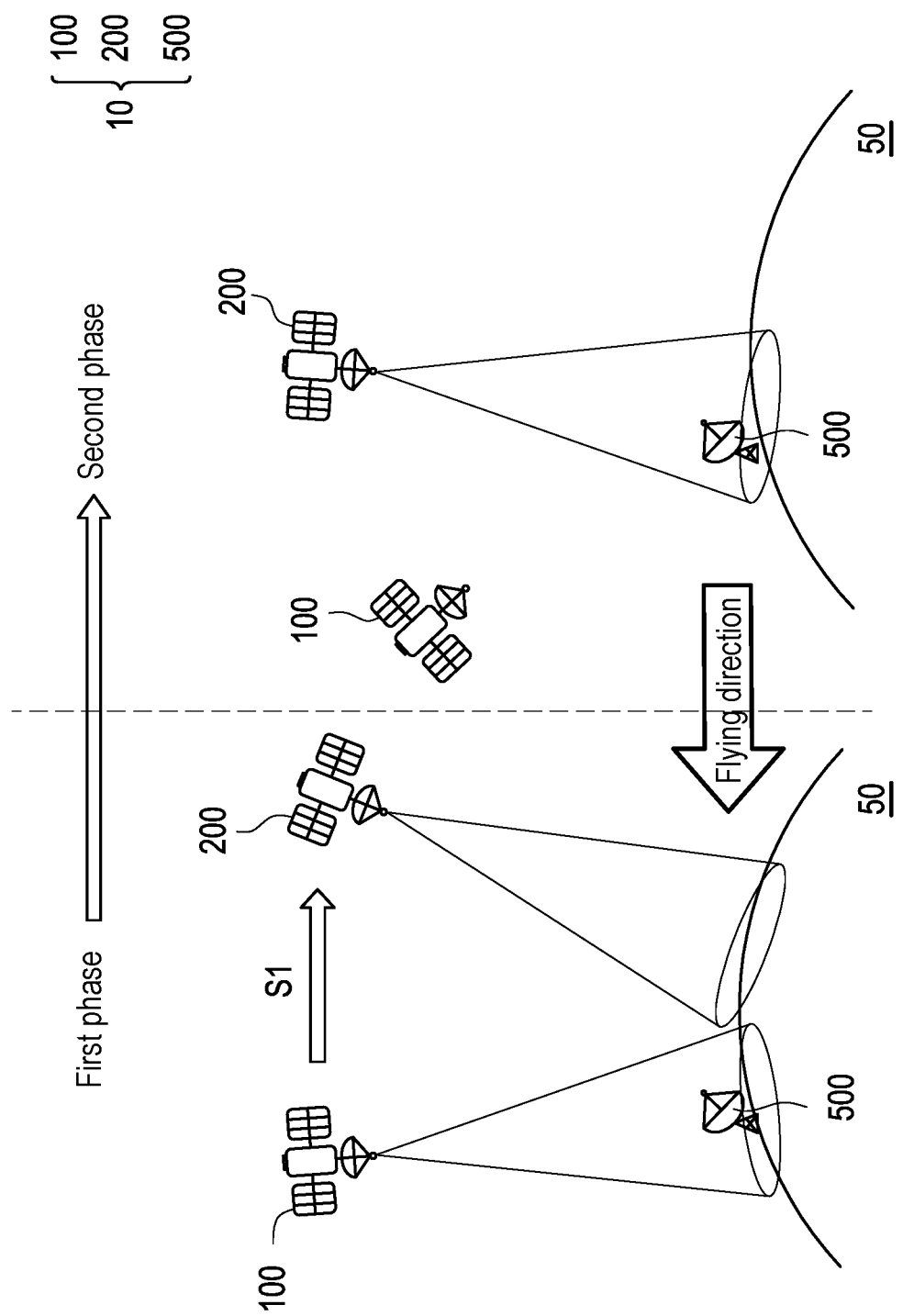
FIG. 3 is a schematic diagram of a satellite communication system according to an embodiment of the disclosure.

FIG. 3 is a schematic diagram of a satellite communication system 10 according to an embodiment of the disclosure. The satellite communication system 10 may include a satellite 100 and a satellite 200. In an embodiment, the satellite communication system 10 may further include a ground station 500. The ground station 500 can be communicatively connected to the satellite 100 or the satellite 200. In an embodiment, the satellite 100 can be communicatively connected to the satellite 200. The satellite 100 and the satellite 200 may have similar hardware specifications or software functions. Accordingly, the satellite 100 and the satellite 200 can perform the same kind of work. The satellite 100 and the satellite 200 may also have the same operating environment. For example, the satellite 100 and the satellite 200 may belong to the same constellation system. The satellite 100 and the satellite 200 may have similar altitudes. The weather condition of the service area of the satellite 100 may be similar to the weather condition of the service area of the satellite 200.

The satellite 100 or the satellite 200 can detect orbit information, and determine whether the satellite is about to enter or leave the service area 50 based on the orbit information.

During the first phase, the satellite 100 is about to leave the service area 50 corresponding to a non-terrestrial network or the ground station 500, and the satellite 200 is about to enter the service area 50. If the satellite 100 detects the presence of an inter-satellite link (ISL) between the satellite 100 and the satellite 200, the satellite 100 can directly transmit the resource scheduling assignment S1 to the satellite 200 through the ISL, and the resource scheduling assignment S1 may include radio resource scheduling, traffic scheduling, service resource control, or reference signals. Then, during the second phase, the satellite 100 has left the service area 50 and the satellite 200 has entered the service area 50. The satellite 200 can access radio resources according to the resource scheduling assignment S1 received from the satellite 100 to communicate with the ground station 500 and provide services for the service area 50.

Figure 4:
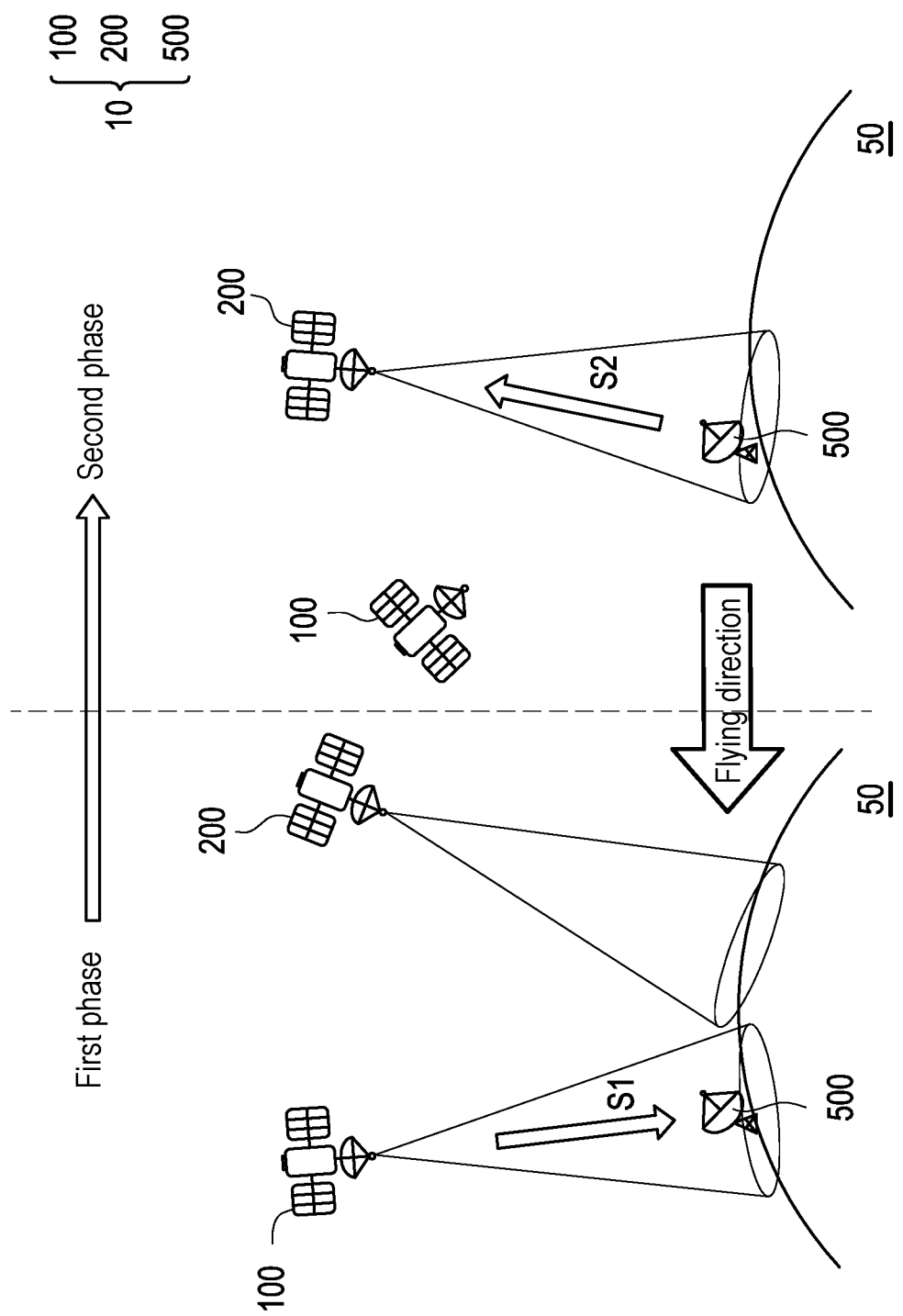
FIG. 4 is a schematic diagram of a satellite communication system according to another embodiment of the disclosure.

The satellite communication system 10 may also use the ground station 500 as a relay to transmit resource scheduling assignment for the satellite 100 and the satellite 200. FIG. 4 is a schematic diagram of a satellite communication system 10 according to another embodiment of the disclosure. During the first phase, the satellite 100 is about to leave the service area 50 corresponding to the non-terrestrial network or the ground station 500, and the satellite 200 is about to enter the service area 50. The satellite 100 can transmit the resource scheduling assignment S1 to the ground station 500. Then, during the second phase, the satellite 100 has left the service area 50 and the satellite 200 has entered the service area 50. The ground station 500 can transmit the resource scheduling assignment S2 to the satellite 200 according to the resource scheduling assignment S1, and the resource scheduling assignment S2 and the resource scheduling assignment S1 can be the same or different. The resource scheduling assignment S2 may include radio resource scheduling, traffic scheduling, service resource control, or reference signals. The ground station 500 can determine the resource scheduling assignment S2 according to factors such as the type of application service provided by the satellite 200 or the resources required by the satellite 200. The satellite 200 can access radio resources according to the resource scheduling assignment S2 received from the ground station 500 to communicate with the ground station 500 and provide services for the service area 50.

Figure 5:
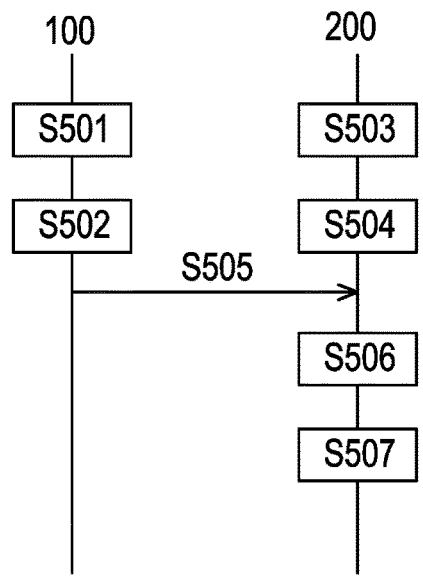
FIG. 5 is a signaling diagram of a satellite communication system according to an embodiment of the disclosure.

FIG. 5 is a signaling diagram of a satellite communication system according to an embodiment of the disclosure, and steps S501 to S505 may correspond to the first phase of FIG. 3, and steps S506 to S507 may correspond to the second phase of FIG. 3. In step S501, the satellite 100 is leaving the service area 50 of the non-terrestrial network. In step S502, the satellite 100 may prepare the resource scheduling assignment S1.

In step S503, the satellite 200 is entering the service area 50 of the non-terrestrial network. In step S504, the satellite 200 can generate an original resource scheduling assignment according to its own computing power, and access radio resources according to the original resource scheduling assignment. For example, the satellite 200 may prestore one or more preset resource scheduling assignments, and may select one preset resource scheduling assignment as the original resource scheduling assignment after entering the service area 50. In another example, the satellite 200 can measure network parameters corresponding to the service area 50, and generate the original resource scheduling assignment based on the network parameters. The network parameters can be associated with the weather condition of the service area 50 or the quality of the reference signal, etc., the disclosure is not limited thereto.

In an embodiment, the satellite 200 can select the original resource scheduling assignment from multiple preset resource scheduling assignments according to the priority. Specifically, the satellite 200 may select a preset resource scheduling assignment with the highest priority from multiple preset resource scheduling as the original resource scheduling assignment. The priority of resource scheduling assignment may be associated with satellite specifications, measurement results of service quality, radio resource scheduling in the time domain, radio resource scheduling in the frequency domain, or radio resource scheduling in the space domain, and the disclosure is not limited thereto.

In step S505, the satellite 100 may transmit the resource scheduling assignment S1 to the satellite 200 in response to leaving the service area 50 of the non-terrestrial network. The satellite 200 can receive the resource scheduling assignment S1 from the satellite 100 in response to entering the service area 50 of the non-terrestrial network. In an embodiment, the satellite 100 or the satellite 200 can detect the ISL, and transmit/receive resource scheduling assignment S1 through the ISL in response to detecting the ISL. The ISL may include an ISL control channel and an ISL shared channel.

In step S506, the satellite 200 can compare the performance of the original resource scheduling assignment and the resource scheduling assignment S1, and select a resource scheduling assignment with better performance as the selected resource scheduling assignment from the original resource scheduling assignment and the resource scheduling assignment S1. The selected resource scheduling assignment can be the same or different from the resource scheduling assignment S1. In an embodiment, the satellite 200 can use the resource scheduling assignment S1 as a reference to generate the selected resource scheduling assignment according to its own computing power. In other words, the satellite 200 can derive the selected resource scheduling assignment from the resource scheduling assignment S1.

In an embodiment, the satellite 200 can select the selected resource scheduling assignment from the original resource scheduling assignment and the resource scheduling assignment S1 according to the priority. Specifically, if the priority of the original resource scheduling assignment is higher than the priority of the resource scheduling assignment S1, the satellite 200 can select the original resource scheduling assignment as the selected resource scheduling assignment. If the priority of the resource scheduling assignment S1 is higher than the priority of the original resource scheduling assignment, the satellite 200 can select the resource scheduling assignment S1 as the selected resource scheduling assignment.

In step S507, the satellite 200 can access radio resources according to the selected resource scheduling assignment. When the satellite 200 is about to leave the service area 50, the satellite 200 can transmit the selected resource scheduling assignment to other satellites that are about to enter the service area 50 to assist other satellites in accessing the radio resources of the service area 50.

Figure 6:
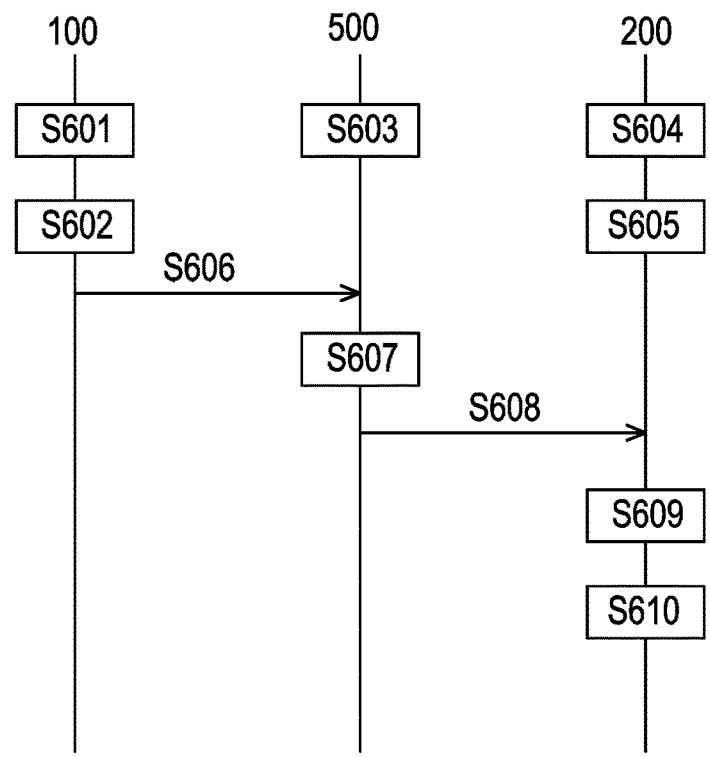
FIG. 6 is a signaling diagram of a satellite communication system according to another embodiment of the disclosure.

FIG. 6 is a signaling diagram of a satellite communication system according to another embodiment of the disclosure. Steps S601 to S607 may correspond to the first phase of FIG. 4, and steps S608 to S610 may correspond to the second phase of FIG. 4. In this embodiment, the satellite 200 can receive resource scheduling assignments from the satellite 100 through the ground station 500.

In step S601, the satellite 100 is leaving the service area 50 of the non-terrestrial network. In step S602, the satellite 100 may prepare the resource scheduling assignment S1. In step S603, the ground station 500 can sense that the satellite 200 enters the service area 50. The ground station 500 can start to prepare the resource scheduling assignment to be transmitted to the satellite 200 after sensing that the satellite 200 enters the service area 50.

In step S604, the satellite 200 is entering the service area 50 of the non-terrestrial network. In step S605, the satellite 200 can generate an original resource scheduling assignment according to its own computing power, and access radio resources according to the original resource scheduling assignment.

In step S606, the satellite 100 can transmit the resource scheduling assignment S1 to the ground station 500 in response to leaving the service area 50 of the non-terrestrial network, thereby transmitting the resource scheduling assignment S2 to the satellite 200 through the ground station 500. The resource scheduling assignment S2 can be the same as or different from the resource scheduling assignment S1. In an embodiment, the satellite 100 can detect the ISL, and can transmit resource scheduling assignment S1 to the ground station 500 in response to not detecting the ISL, thereby attempting to forward the resource scheduling assignment S1 to the satellite 200 through the ground station 500. The satellite 100 may communicate with the ground station 500 through a ground station uplink, and the ground station uplink may include a physical uplink shared channel or a data plane message.

In step S607, the ground station 500 may receive the resource scheduling assignment S1 from the satellite 100 leaving the service area 50 of the non-terrestrial network.

In an embodiment, the ground station 500 may select the resource scheduling assignment S2 from multiple resource scheduling assignments according to the priority, and the multiple resource scheduling assignments may include resource scheduling assignment S1 from the satellite 100. Specifically, the ground station 500 can pre-store or instantly generate at least one resource scheduling assignment. The ground station 500 can select the resource scheduling assignment with the highest priority as the resource scheduling assignment S2 from the at least one resource scheduling assignment.

In an embodiment, if a specific satellite is successfully connected to the ground station 500, the ground station 500 may store the resource scheduling assignment corresponding to the specific satellite as the at least one resource scheduling assignment.

In an embodiment, the ground station 500 can measure the network parameters of the service area 50, and generate the at least one resource scheduling assignment according to the network parameters. The network parameters can be associated with the weather condition of the service area 50 or the quality of the reference signal, and the disclosure is not limited thereto.

The resource scheduling assignment S1 and the resource scheduling assignment S2 may be the same. For example, if the resource scheduling assignment S1 has the highest priority among the at least one resource scheduling assignment, the ground station 500 can set the resource scheduling assignment S2 as the resource scheduling assignment S1. On the other hand, the resource scheduling assignment S1 and the resource scheduling assignment S2 can be different. For example, if the resource scheduling assignment with the highest priority among the at least one resource scheduling assignment is not the resource scheduling assignment S1 but other specific resource scheduling assignment, the ground station 500 can set the resource scheduling assignment S2 as the specific resource scheduling assignment.

In an embodiment, the ground station 500 can determine the resource scheduling assignment S2 according to factors such as satellite specifications, measurement results of service quality, radio resource scheduling in the time domain, radio resource scheduling in the frequency domain, or radio resource scheduling in the space domain. For example, if the satellite 100 and the satellite 200 have similar satellite specifications, the ground station 500 can determine that the resource scheduling assignment S1 from the satellite 100 can be applied to the resource scheduling assignment S2. Accordingly, the ground station 500 can set the resource scheduling assignment S2 as the resource scheduling assignment S1.

In step S608, the ground station 500 may transmit the resource scheduling assignment S2 to the satellite 200 entering the service area 50 according to the resource scheduling assignment S1. The satellite 200 can receive the resource scheduling assignment S2 from the ground station 500 in response to entering the service area 50 of the non-terrestrial network. In an embodiment, the satellite 200 can detect the ISL, and can receive the resource scheduling assignment S2 from the ground station 500 in response to not detecting the ISL. The satellite 200 can communicate with the ground station 500 through a ground station uplink, and the ground station uplink may include a physical uplink shared channel or data plane message.

In an embodiment, the ground station 500 may transmit the resource scheduling assignment S2 to the satellite 200 in response to the satellite 200 entering the service area 50 not performing as expected, so as to improve the resource utilization efficiency of the satellite 200. For example, if the ground station 500 detects that the service quality of the satellite 200 is poor, the ground station 500 can transmit the resource scheduling assignment S2 to the satellite 200.

In step S609, the satellite 200 may compare the performance of the original resource scheduling assignment and the resource scheduling assignment S2, and select a resource scheduling assignment with better performance as the selected resource scheduling assignment from the original resource scheduling assignment and the resource scheduling assignment S2. The selected resource scheduling assignment can be the same as or different from the resource scheduling assignment S2. In an embodiment, the satellite 200 can use the resource scheduling assignment S2 as a reference to generate the selected resource scheduling assignment according to its own computing power. In other words, the satellite 200 can derive the selected resource scheduling assignment from the resource scheduling assignment S2.

In an embodiment, the satellite 200 can select the selected resource scheduling assignment from the original resource scheduling assignment and the resource scheduling assignment S2 according to the priority. Specifically, if the priority of the original resource scheduling assignment is higher than the priority of the resource scheduling assignment S2, the satellite 200 can select the original resource scheduling assignment as the selected resource scheduling assignment. If the priority of the resource scheduling assignment S2 is higher than the priority of the original resource scheduling assignment, the satellite 200 can select the resource scheduling assignment S2 as the selected resource scheduling assignment.

In step S610, the satellite 200 can access radio resources according to the selected resource scheduling assignment. When the satellite 200 is about to leave the service area 50, the satellite 200 can transmit the selected resource scheduling assignment to other satellites that are about to enter the service area 50 to assist other satellites in accessing the radio resources of the service area 50.

Figure 7:
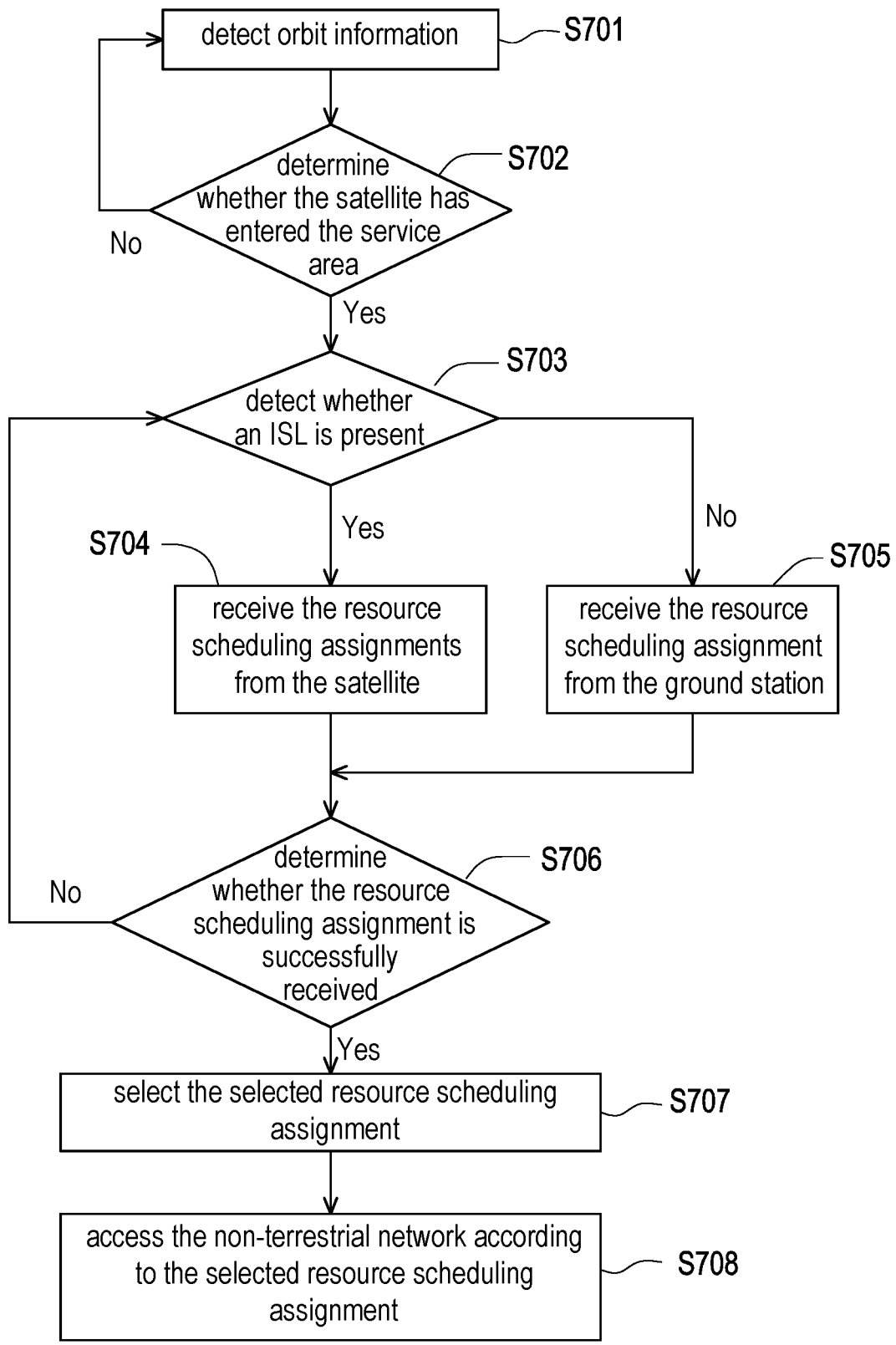
FIG. 7 is a flowchart of a satellite entering a service area according to an embodiment of the disclosure.

FIG. 7 is a flowchart of the satellite 200 entering the service area 50 according to an embodiment of the disclosure. In step S701, the satellite 200 can detect orbit information. In step S702, the satellite 200 can determine whether the satellite has entered the service area 50 of the non-terrestrial network according to the orbit information. If the satellite 200 has entered the service area 50, step S703 is performed. If the satellite 200 does not enter the service area 50, step S701 is performed again. In step S703, the satellite 200 can detect whether an ISL between the satellite 200 and the satellite 100 is present. If the ISL is present, step S704 is performed. If the ISL is not present, step S705 is performed. In step S704, the satellite 200 can receive the resource scheduling assignments from the satellite 100 through the ISL. In step S705, the satellite 200 may receive the resource scheduling assignment from the ground station 500. In step S706, the satellite 200 may determine whether the resource scheduling assignment is successfully received. If the satellite 200 has received the resource scheduling assignment, step S707 is performed. If the satellite 200 does not receive the resource scheduling assignment, step S703 is performed again. In step S707, the satellite 200 can select the selected resource scheduling assignment from the at least one resource scheduling assignment. In step S708, the satellite 200 can access the non-terrestrial network according to the selected resource scheduling assignment.

Figure 8:
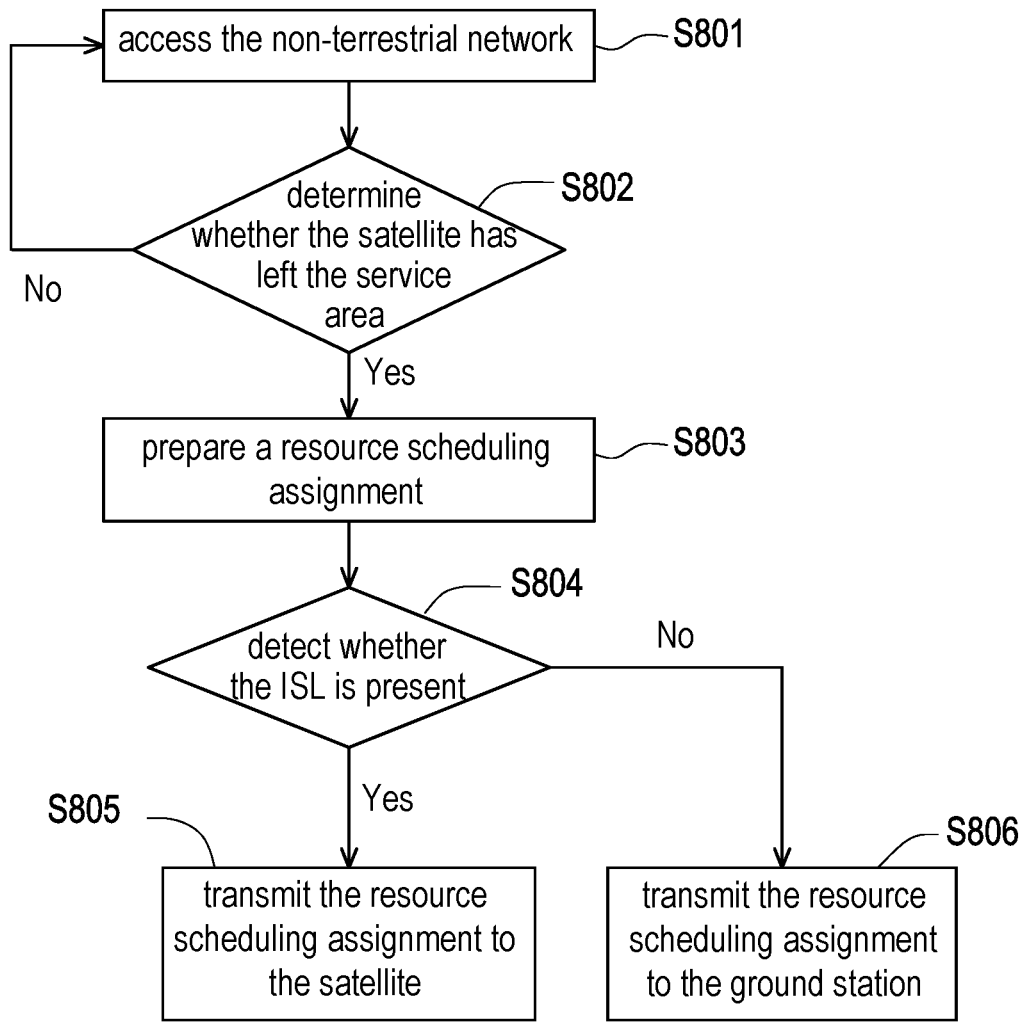
FIG. 8 is a flowchart of a satellite leaving a service area according to an embodiment of the disclosure.

FIG. 8 is a flowchart of the satellite 100 leaving the service area 50 according to an embodiment of the disclosure. In step S801, the satellite 100 can access the non-terrestrial network corresponding to the service area 50, and can detect orbit information. In step S802, the satellite 100 can determine whether the satellite has left the service area 50 according to the orbit information. If the satellite 100 has left the service area 50, step S803 is performed. If the satellite 100 has not left the service area 50, step S801 is performed again. In step S803, the satellite 100 may prepare a resource scheduling assignment for the satellite 200 which enters the service area 50. In step S804, the satellite 100 can detect whether the ISL between the satellite 100 and the satellite 200 is present. If the ISL is present, step S805 is performed. If the ISL is not present, step S806 is performed. In step S805, the satellite 100 can directly transmit the resource scheduling assignment to the satellite 200. In step S806, the satellite 200 can transmit the resource scheduling assignment to the ground station 500, so as to transmit the resource scheduling assignment to the satellite 200 through the ground station 500. It should be noted that the resource scheduling assignment transmitted by the ground station 500 to the satellite 200 may be different from the resource scheduling assignment transmitted by the satellite 100 to the ground station 500.

Figure 9:
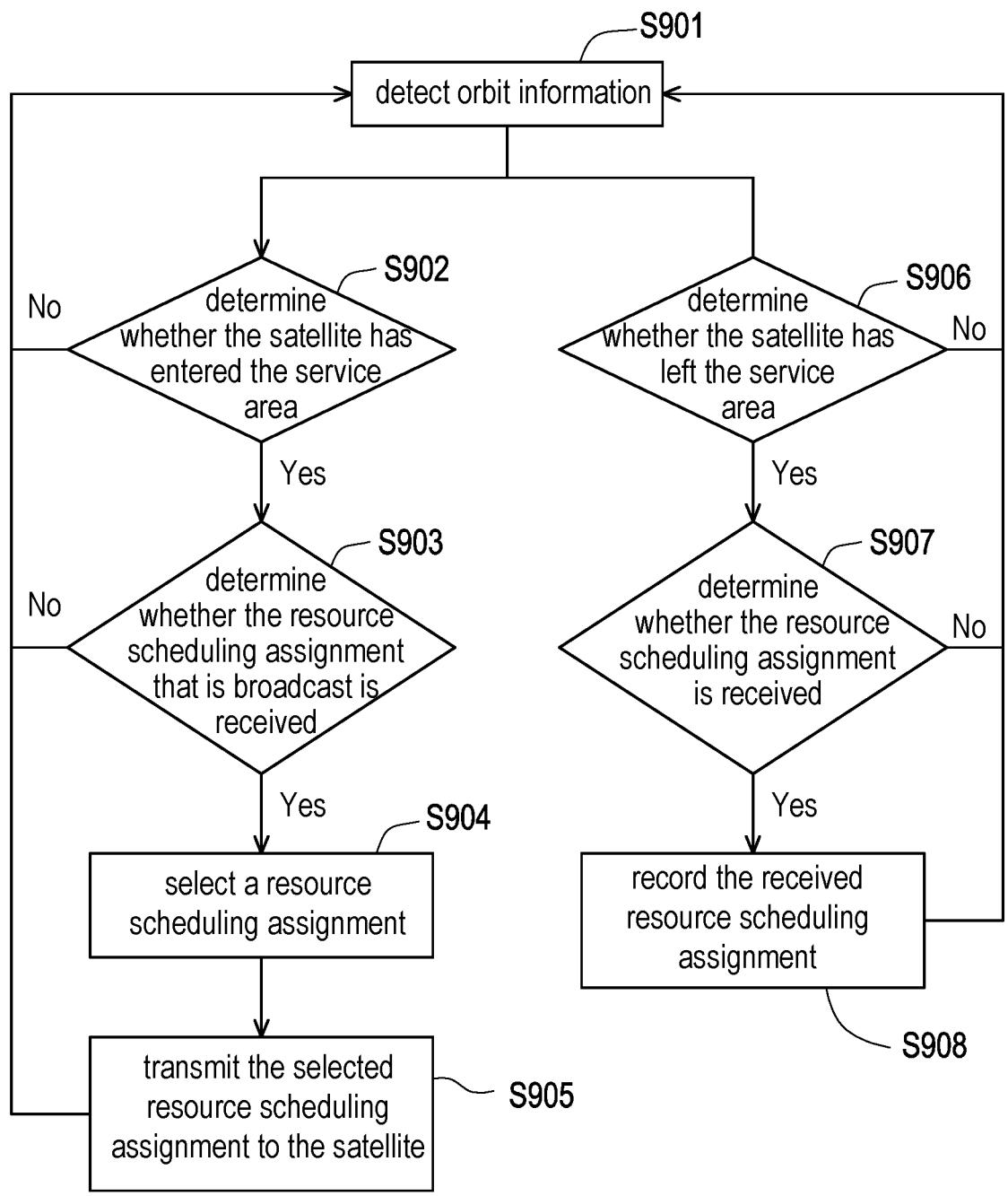
FIG. 9 is a flowchart of a ground station according to an embodiment of the disclosure.

FIG. 9 is a flowchart of the ground station 500 according to an embodiment of the disclosure. In step S901, the ground station 500 can detect orbit information. In step S902, the ground station 500 can determine whether the satellite 200 has entered the service area 50 of the non-terrestrial network based on the orbit information. If the satellite 200 has entered the service area 50, step S903 is performed. If the satellite 200 has not entered the service area 50, step S901 is performed again. In step S903, the ground station 500 can determine whether the resource scheduling assignment broadcast by the satellite 100 is received. If the ground station 500 receives the resource scheduling assignment, step S904 is performed. If the ground station 500 does not receive the resource scheduling assignment, step S901 is performed again. In step S904, the ground station 500 can select a resource scheduling assignment from the multiple resource scheduling assignments. In step S905, the ground station 500 may transmit the selected resource scheduling assignment to the satellite 200. In step S906, the ground station 500 can determine whether the satellite 100 has left the service area 50 of the non-terrestrial network based on the orbit information. If the satellite 100 has left the service area 50, step S907 is performed. If the satellite 100 does not leave the service area 50, step S901 is performed again. In step S907, the ground station 500 can determine whether the resource scheduling assignment from the satellite 100 is received. If the ground station 500 receives the resource scheduling assignment, step S908 is performed. If the ground station 500 does not receive the resource scheduling assignment, step S901 is performed again. In step S908, the ground station 500 may record the received resource scheduling assignment.

Figure 10:
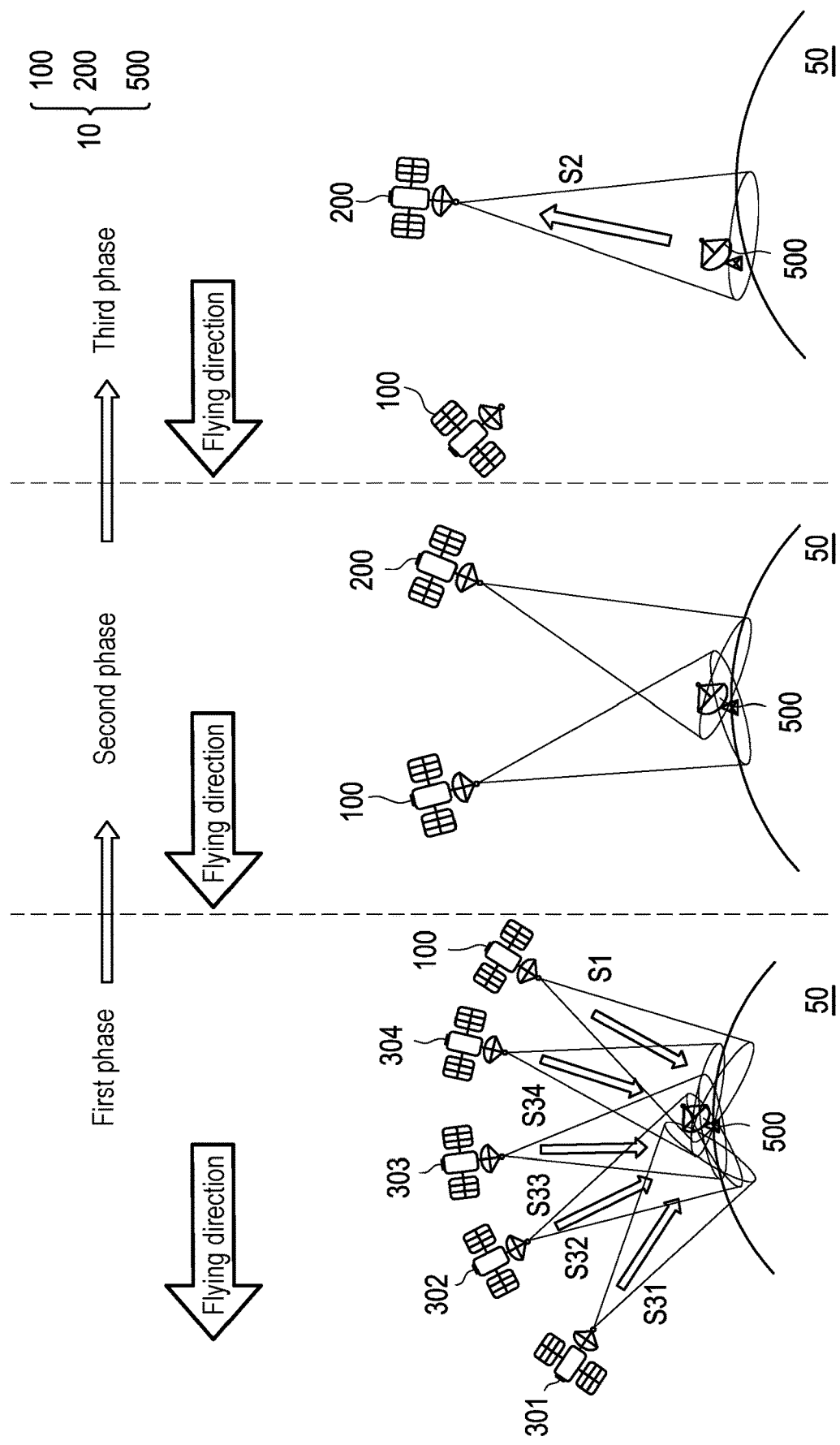
FIG. 10 is a schematic diagram of obtaining multiple resource scheduling assignments by a ground station according to an embodiment of the disclosure.

FIG. 10 is a schematic diagram of obtaining multiple resource scheduling assignments from the ground station 500 according to an embodiment of the disclosure. During the first phase, the ground station 500 can record the resource scheduling assignment corresponding to the satellite successfully connected to the ground station. The resource scheduling assignment can include the resource scheduling assignment S31 from the satellite 301, the resource scheduling assignment S32 from the satellite 302, the resource scheduling assignment S33 from the satellite 303, the resource scheduling assignment S34 from the satellite 304, and the resource scheduling assignment S1 from the satellite 100.

Specifically, when a local communication device communicates with a satellite, the communication device can report information related to service quality to the satellite. The information related to service quality may include the number of packets in the buffer of the communication device, latency requirement, reliability requirement, date rate requirement or packet arrival period and other parameters. When the ground station 500 provides services for the satellite, the ground station 500 can record the resource scheduling assignment and satellite specifications of the satellite, and can test the recorded resource scheduling assignment by other satellites with similar specifications.

During the second phase, when the ground station 500 detects that the satellite 200 enters the service area 50, the ground station 500 can select the resource scheduling assignment S2 that enables the satellite 200 to have better performance from the recorded resource scheduling assignments (i.e., resource scheduling assignments S31, S32, S33, S34, and S1). For example, if compared to the resource scheduling assignments S31, S32, S33, and S34, the resource scheduling assignment S1 can enable the satellite 200 to have better service quality, then the ground station 500 can set the resource scheduling assignment S2 to the resource scheduling assignment S1.

During the third phase, the ground station 500 can transmit the selected resource scheduling assignment S2 to the satellite 200.

Figure 11:
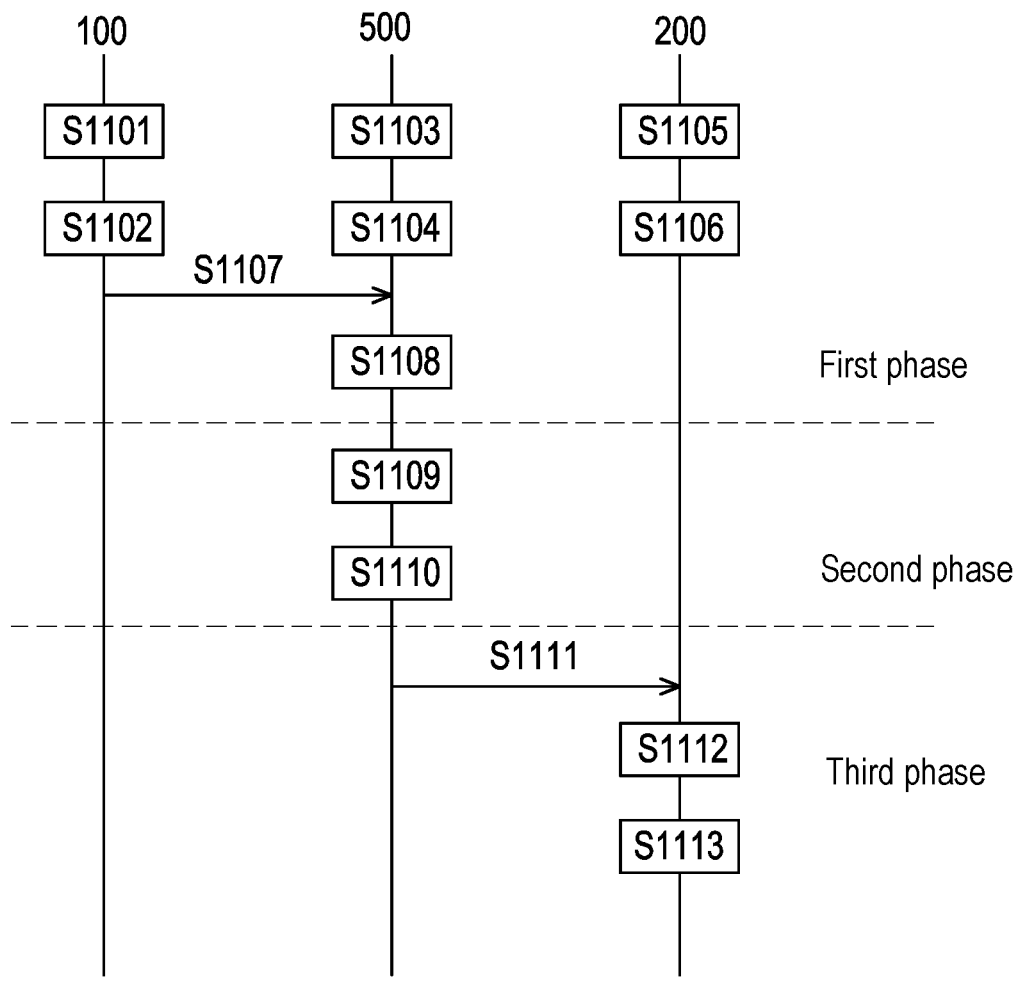
FIG. 11 is a signaling diagram of the satellite communication system of FIG. 10 according to an embodiment of the disclosure.

FIG. 11 is a signaling diagram of the satellite communication system 10 of FIG. 10 according to an embodiment of the disclosure. If the satellite communication system 10 further includes satellites 301, 302, 303, and 304, the steps S1101 and S1102 corresponding to the satellite 100 are also adaptable for the satellites 301, 302, 303, and 304. In step S1101, the satellite 100 can be served by the ground station 500. In step S1102, the satellite 100 may prepare a resource scheduling assignment. In step S1103, the ground station 500 may perform radio resource allocation. In step S1104, the ground station 500 may record the resource scheduling assignment. In step S1105, the satellite 200 may perform radio resource acquirement. In step S1106, the satellite 200 can be served by the ground station 500. In step S1107, the satellite 100 can transmit the resource scheduling assignment to the ground station 500. In step S1108, the ground station 500 can receive resource scheduling assignment. In step S1109, the ground station 500 can compare and test the allocated radio resource scheduling and the received resource scheduling assignment. In step S1110, the ground station 500 can select a better scheduling from the allocated radio resource scheduling and the received resource scheduling assignment. Assuming that the better scheduling is the received resource scheduling assignment, in step S1111, the ground station 500 can transmit the resource scheduling assignment to the satellite 200. In step S1112, the satellite 200 can compare the original radio resource scheduling with the received resource scheduling assignment. In step S1113, the satellite 200 can select a better scheduling from the original radio resource scheduling and the received resource scheduling assignment.

Figure 12:
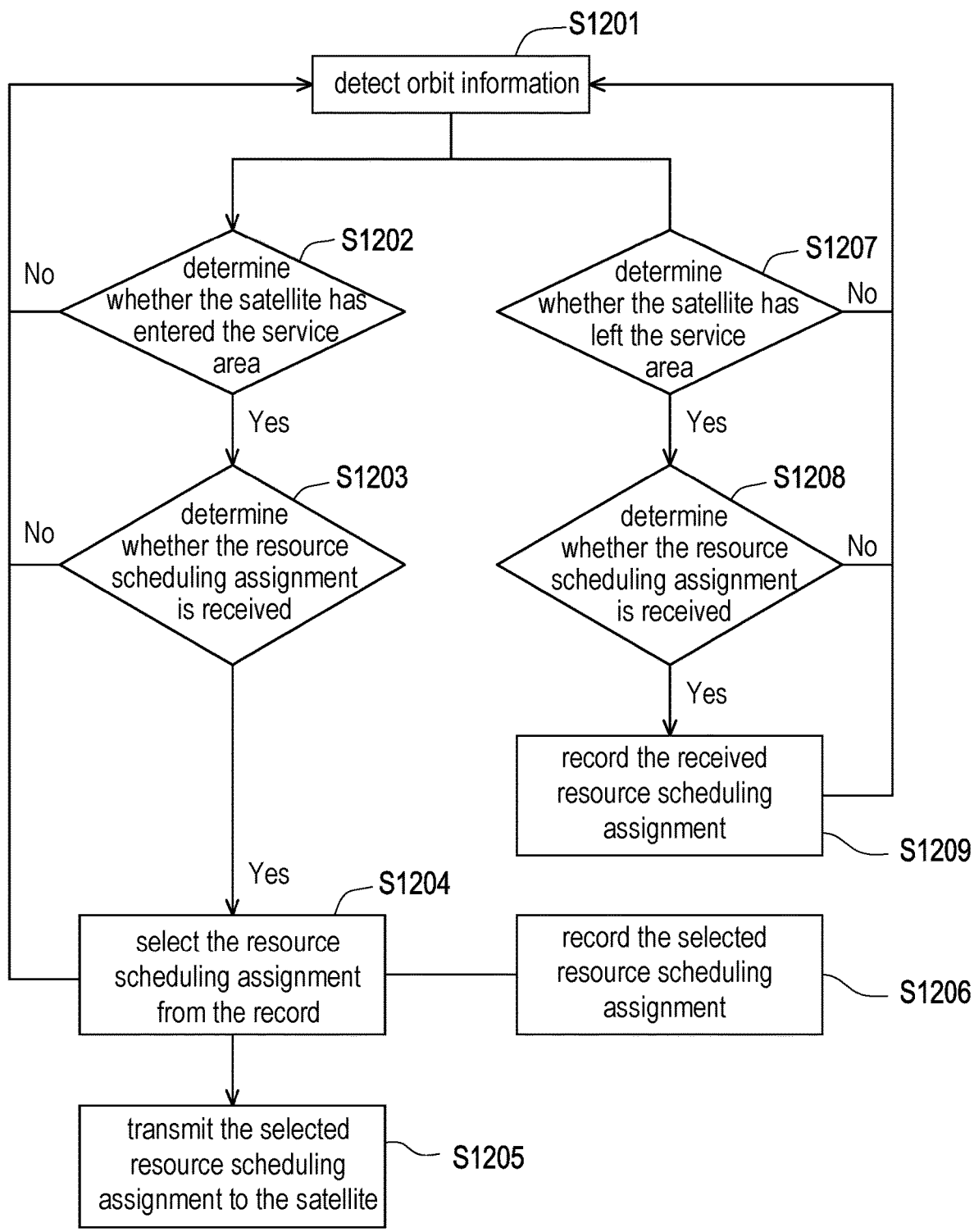
FIG. 12 is a flowchart of the ground station in FIG. 10 according to an embodiment of the disclosure.

FIG. 12 is a flowchart of the ground station 500 of FIG. 10 according to an embodiment of the disclosure. Since the process performed by the satellite 100 in FIG. 10 is the same as that of FIG. 7 and the process performed by the satellite 200 is the same as that of FIG. 8, no repetition is incorporated herein. In step S1201, the ground station 500 can detect orbit information. In step S1202, the ground station 500 can determine whether the satellite 200 has entered the service area 50 of the non-terrestrial network. If the satellite 200 has entered the service area 50, step S1203 is performed. If the satellite 200 has not entered the service area 50, step S1201 is performed again. In step S1203, the ground station 500 can determine whether the resource scheduling assignment from the satellite 100 is received. If the ground station 500 receives the resource scheduling assignment, step S1204 is performed. If the ground station 500 does not receive the resource scheduling assignment, step S1201 is performed again. In step S1204, the ground station 500 can select the resource scheduling assignment from the record. In step S1205, the ground station 500 may transmit the selected resource scheduling assignment to the satellite 200. In step S1206, the ground station 500 may record the selected resource scheduling assignment for use by satellites with similar specifications. In step S1207, the ground station 500 can determine whether the satellite 100 has left the service area 50. If the satellite 100 has left the service area 50, step S1208 is performed. If the satellite 100 does not leave the service area 50, step S1201 is performed again. In step S1208, the ground station 500 can determine whether the resource scheduling assignment from the satellite 100 is received. If the ground station 500 receives the resource scheduling assignment, step S1209 is performed. If the ground station 500 does not receive the resource scheduling assignment, step S1201 is performed again. In step S1209, the ground station 500 may record the received resource scheduling assignment.

Figure 13:
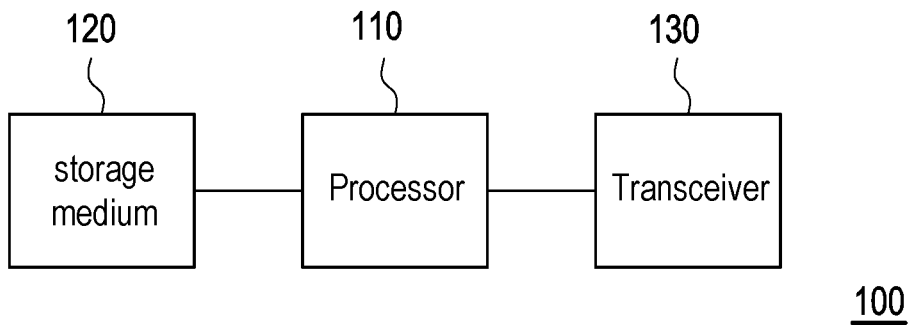
FIG. 13 is a schematic diagram of a satellite according to an embodiment of the disclosure.

FIG. 13 is a schematic diagram of the satellite 100 according to an embodiment of the disclosure. The satellite 100 may include a processor 110, a storage medium 120, and a transceiver 130. The processor 110 is, for example, a central processing unit (CPU), or other programmable general-purpose or special-purpose micro control unit (MCU), microprocessor, or digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components. The processor 110 may be coupled to the storage medium 120 and the transceiver 130, and access and execute multiple modules and various application programs stored in the storage medium 120.

The storage medium 120 is, for example, any type of fixed or removable random access memory (RAM), read-only memory (ROM), flash memory, hard disk drive (HDD), solid state drive (SSD) or similar components or a combination of the above components, and configured to store multiple modules or various application programs that can be executed by the processor 110. In this embodiment, the storage medium 120 can record resource scheduling assignments.

The transceiver 130 transmits and receives signals in a wireless or wired manner. The transceiver 130 may also perform operations such as low noise amplification, impedance matching, frequency mixing, up or down frequency conversion, filtering, amplification, and the like. The satellite 100 can communicate with the satellite 200 or the ground station 500 through the transceiver 130.

Figure 14:
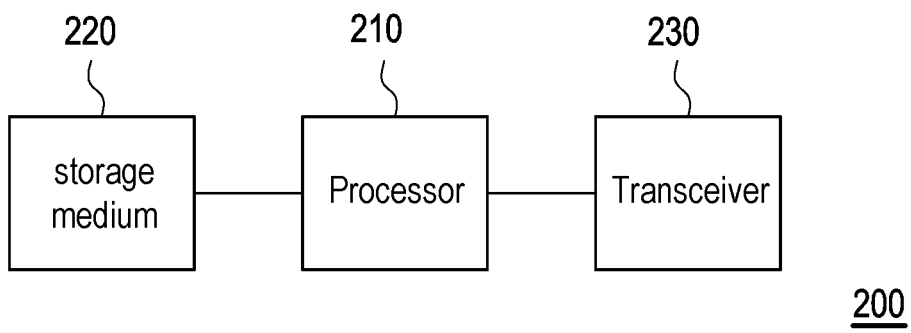
FIG. 14 is a schematic diagram of a satellite according to an embodiment of the disclosure.

FIG. 14 is a schematic diagram of a satellite 200 according to an embodiment of the disclosure. The satellite 200 may include a processor 210, a storage medium 220, and a transceiver 230. The processor 210 is, for example, a central processing unit (CPU), or other programmable general-purpose or special-purpose micro control unit (MCU), microprocessor, or digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components. The processor 210 may be coupled to the storage medium 220 and the transceiver 230, and access and execute multiple modules and various application programs stored in the storage medium 220.

The storage medium 220 is, for example, any type of fixed or removable random access memory (RAM), read-only memory (ROM), flash memory, hard disk drive (HDD), solid state drive (SSD) or similar components or a combination of the above components, and configured to store multiple modules or various application programs that can be executed by the processor 210. In this embodiment, the storage medium 220 can record resource scheduling assignments.

The transceiver 230 transmits and receives signals in a wireless or wired manner. The transceiver 230 may also perform operations such as low noise amplification, impedance matching, frequency mixing, up or down frequency conversion, filtering, amplification, and the like. The satellite 200 can communicate with the satellite 100 or the ground station 500 through the transceiver 230.

Figure 15:
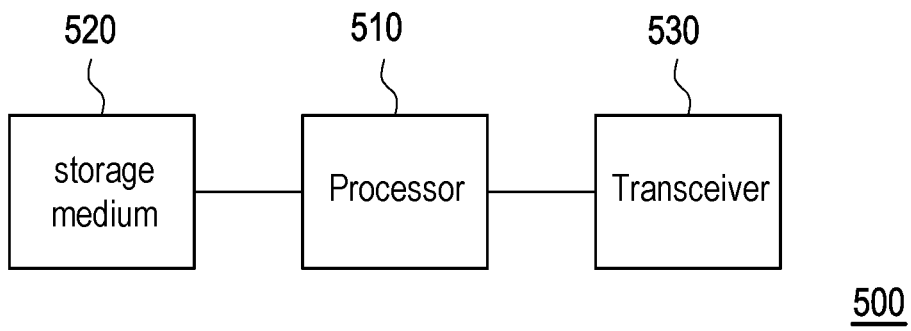
FIG. 15 is a schematic diagram of a ground station according to an embodiment of the disclosure.

FIG. 15 is a schematic diagram of a ground station 500 according to an embodiment of the disclosure. The ground station 500 may include a processor 510, a storage medium 520, and a transceiver 530. The processor 510 is, for example, a central processing unit (CPU), or other programmable general-purpose or special-purpose micro control unit (MCU), microprocessor, or digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components. The processor 510 may be coupled to the storage medium 520 and the transceiver 530, and access and execute multiple modules and various application programs stored in the storage medium 520.

The storage medium 520 is, for example, any type of fixed or removable random access memory (RAM), read-only memory (ROM), flash memory, hard disk drive (HDD), solid state drive (SSD) or similar components or a combination of the above components, and configured to store multiple modules or various application programs that can be executed by the processor 510. In this embodiment, the storage medium 520 can record resource scheduling assignments.

The transceiver 530 transmits and receives signals in a wireless or wired manner. The transceiver 530 may also perform operations such as low noise amplification, impedance matching, frequency mixing, up or down frequency conversion, filtering, amplification, and the like. The ground station 500 can communicate with the satellite 100 or the satellite 200 through the transceiver 530.

Figure 16:
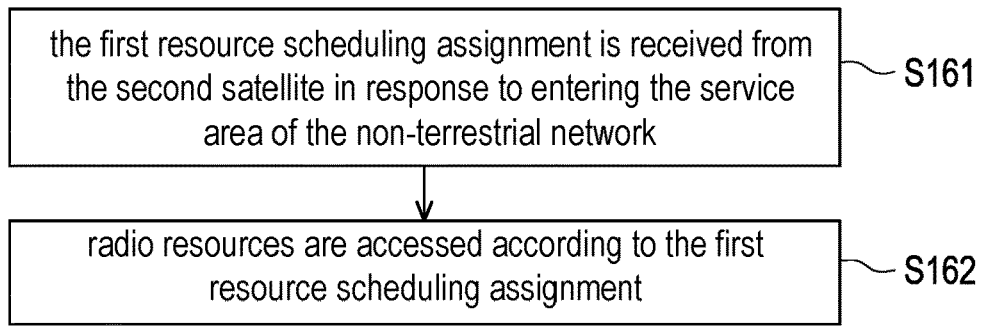
FIG. 16 is a flowchart of a method for managing radio resources of a non-terrestrial network according to an embodiment of the disclosure.

FIG. 16 is a flowchart of a method for managing radio resources of a non-terrestrial network according to an embodiment of the disclosure. The method can be implemented by the satellite 100 or the satellite 200. In step S161, the first resource scheduling assignment is received from the second satellite in response to entering the service area of the non-terrestrial network. In step S162, radio resources are accessed according to the first resource scheduling assignment.

Figure 17:
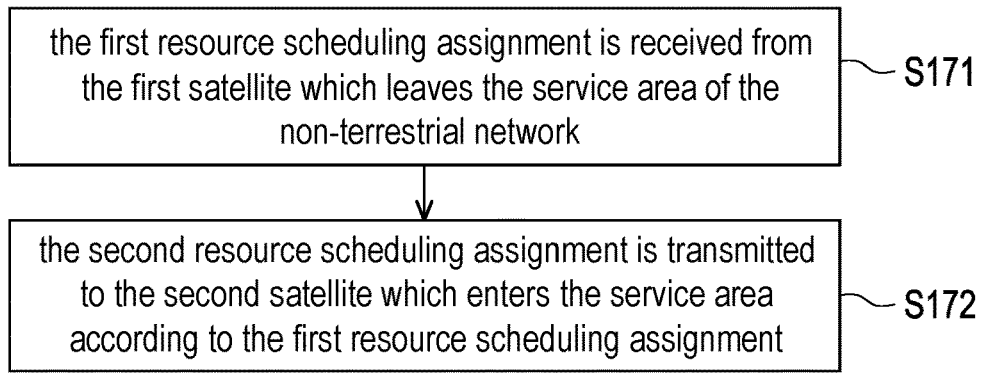
FIG. 17 is a flowchart of a method for managing radio resources of a non-terrestrial network according to another embodiment of the disclosure.

FIG. 17 is a flowchart of a method for managing radio resources of a non-terrestrial network according to another embodiment of the disclosure. The method can be implemented by the ground station 500. In step S171, the first resource scheduling assignment is received from the first satellite which leaves the service area of the non-terrestrial network. In step S172, the second resource scheduling assignment is transmitted to the second satellite which enters the service area according to the first resource scheduling assignment.

Figure 18:
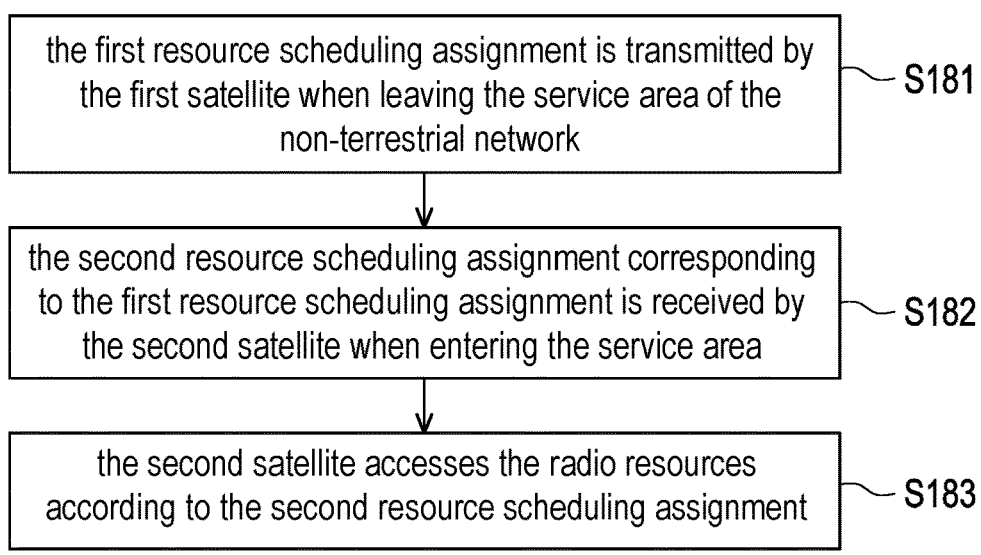
FIG. 18 is a flowchart of a method for managing radio resources of a non-terrestrial network according to another embodiment of the disclosure.

FIG. 18 is a flowchart of a method for managing radio resources of a non-terrestrial network according to another embodiment of the disclosure. The method can be implemented by the satellite communication system 10, and the satellite communication system 10 can at least include a first satellite and a second satellite. In step S181, the first resource scheduling assignment is transmitted by the first satellite when the first satellite leaves the service area of the non-terrestrial network. In step S182, the second resource scheduling assignment corresponding to the first resource scheduling assignment is received by the second satellite when the second satellite enters the service area. In step S183, the second satellite accesses the radio resources according to the second resource scheduling assignment.

In summary, the satellite communication system of the disclosure can transmit the resource scheduling assignment of the satellite that is about to leave the service area to another satellite that is about to enter the service area. When the specifications and operating environments of the two satellites are similar, the satellite that enters the service area late can also achieve good performance based on the existing resource scheduling assignment. The satellite communication system can use ground station as a relay to forward resource scheduling assignment for two satellites. If the ILS is present, the satellite communication system can also directly transmit the resource scheduling assignment through the ISL. On the other hand, the ground station can record the resource scheduling assignment of satellites that perform well. When a satellite with similar specification enters the service area, the ground station can transmit the resource scheduling assignment to the satellite to improve the performance of the satellite. Accordingly, the satellite communication system can reduce the computational burden of the satellite through forwarding the resource scheduling assignment, and can make the radio resources be used more efficiently.

What is claimed is:

1. A method for managing radio resources of a non-terrestrial network, adaptable for satellites, wherein the method comprises:
receiving a first resource scheduling assignment from a second satellite in response to entering a service area of the non-terrestrial network; and
accessing the radio resources according to the first resource scheduling assignment.

2. The method according to claim 1, wherein the step of receiving the first resource scheduling assignment from the second satellite in response to entering the service area of the non-terrestrial network comprises:
receiving the first resource scheduling assignment from the second satellite through a ground station.

3. The method according to claim 1, wherein the step of receiving the first resource scheduling assignment from the second satellite in response to entering the service area of the non-terrestrial network comprises:
detecting whether an inter-satellite link (ISL) is present; and
receiving the first resource scheduling assignment directly from the second satellite in response to a presence of the ISL.

4. The method according to claim 2, wherein the step of receiving the first resource scheduling assignment from the second satellite in response to entering the service area of the non-terrestrial network further comprises:

detecting whether an ISL is present; and
receiving the first resource scheduling assignment through the ground station in response to an absence of the ISL.

5. The method according to claim 1, further comprising: transmitting a second resource scheduling assignment to a third satellite in response to leaving the service area.

6. The method according to claim 5, further comprising: determining the second resource scheduling assignment according to the first resource scheduling assignment.

7. The method according to claim 5, wherein the step of transmitting the second resource scheduling assignment to the third satellite in response to leaving the service area comprises:
detecting whether an ISL is present; and
transmitting the second resource scheduling assignment directly to the third satellite in response to a presence of the ISL.

8. The method according to claim 7, wherein the step of transmitting the second resource scheduling assignment to the third satellite in response to leaving the service area further comprises:
transmitting the second resource scheduling assignment to the third satellite through a ground station in response to an absence of the ISL.

9. The method according to claim 1, wherein the step of accessing the radio resources according to the first resource scheduling assignment comprises:
determining a first priority of the first resource scheduling assignment and at least one priority of at least one resource scheduling assignment; and
selecting the first resource scheduling assignment to access the radio resources in response to the first priority being higher than the at least one priority.

10. The method according to claim 9, wherein the first priority is associated with at least one of the following:
satellite specifications, measurement results of service quality, radio resource scheduling in a time domain, radio resource scheduling in a frequency domain, or radio resource scheduling in a space domain.

11. The method according to claim 9, further comprising:
measuring network parameters corresponding to the service area; and
generating the at least one resource scheduling assignment according to the network parameters.

12. The method according to claim 1, wherein the first resource scheduling assignment comprises at least one of the following: radio resource scheduling, traffic scheduling, or service resource control.

13. A method for managing radio resources of a non-terrestrial network, adaptable for a ground station, wherein the method comprises:
receiving a first resource scheduling assignment from a first satellite which leaves a service area of the non-terrestrial network; and
transmitting a second resource scheduling assignment to a second satellite which enters the service area according to the first resource scheduling assignment.

14. The method according to claim 13, wherein the second resource scheduling assignment is the same as the first resource scheduling assignment, and the step of transmitting the second resource scheduling assignment to the second satellite which enters the service area according to the first resource scheduling assignment comprises:
determining a first priority of the second resource scheduling assignment and at least one priority of at least one resource scheduling assignment; and
selecting to transmit the second resource scheduling assignment to the second satellite in response to the first priority being higher than the at least one priority.

15. The method according to claim 13, wherein the second resource scheduling assignment is different from the first resource scheduling assignment, and the step of transmitting the second resource scheduling assignment to the second satellite which enters the service area according to the first resource scheduling assignment comprises:
determining a first priority of the second resource scheduling assignment and at least one priority of the at least one resource scheduling assignment, wherein the at least one resource scheduling assignment comprises the first resource scheduling assignment; and
selecting to transmit the second resource scheduling assignment to the second satellite in response to the first priority being higher than the at least one priority.

16. The method according to claim 14, wherein the first priority is associated with at least one of the following:
satellite specifications, measurement results of service quality, radio resource scheduling in a time domain, radio resource scheduling in a frequency domain, or radio resource scheduling in a space domain.

17. The method according to claim 14, further comprising:
measuring network parameters corresponding to the service area; and
generating the at least one resource scheduling assignment according to the network parameters.

18. The method according to claim 13, wherein the second resource scheduling assignment comprises at least one of the following: radio resource scheduling, traffic scheduling, or service resource control.

19. A method for managing radio resources of a non-terrestrial network, adaptable for a satellite communication system, wherein the satellite communication system comprises a first satellite and a second satellite, and the method comprises:
transmitting a first resource scheduling assignment by the first satellite when leaving a service area of the non-terrestrial network;
receiving a second resource scheduling assignment corresponding to the first resource scheduling assignment when the second satellite enters the service area; and
accessing the radio resources by the second satellite according to the second resource scheduling assignment.

20. The method according to claim 19, wherein the step of receiving the second resource scheduling assignment corresponding to the first resource scheduling assignment by the second satellite when entering the service area comprises:
detecting whether an ISL is present by the second satellite; and
receiving the second resource scheduling assignment directly from the first satellite by the second satellite in response to a presence of the ISL, wherein the second resource scheduling assignment is the same as the first resource scheduling assignment.

21. The method according to claim 20, wherein the step of receiving the second resource scheduling assignment corresponding to the first resource scheduling assignment by the second satellite when entering the service area further comprises:
receiving the second resource scheduling assignment from a ground station by the second satellite in response to an absence of the ISL.

22. The method according to claim 19, wherein the step of accessing the radio resources by the second satellite according to the second resource scheduling assignment comprises:
- determining, by the second satellite, a first priority of the second resource scheduling assignment and at least one priority of at least one resource scheduling assignment; and
- selecting, by the second satellite, the second resource scheduling assignment to access the radio resources in response to the first priority being higher than the at least one priority.

23. The method according to claim 22, wherein the first priority is associated with at least one of the following:
- satellite specifications, measurement results of service quality, radio resource scheduling in a time domain, radio resource scheduling in a frequency domain, or radio resource scheduling in a space domain.

24. The method according to claim 22, further comprising:
- measuring network parameters of the service area by the second satellite; and
- generating the at least one resource scheduling assignment by the second satellite according to the network parameters.

25. The method according to claim 19, further comprising:
- receiving the first resource scheduling assignment from the first satellite by a ground station; and
- transmitting the second resource scheduling assignment to the second satellite by the ground station in response to receiving the first resource scheduling assignment.

26. The method according to claim 25, wherein the second resource scheduling assignment is the same as the first resource scheduling assignment, and the step of transmitting the second resource scheduling assignment to the second satellite by the ground station in response to receiving the first resource scheduling assignment comprises:
- determining, by the ground station, a first priority of the second resource scheduling assignment and at least one priority of at least one resource scheduling assignment; and
- selecting, by the ground station, to transmit the second resource scheduling assignment to the second satellite in response to the first priority being higher than the at least one priority.

27. The method according to claim 25, wherein the second resource scheduling assignment is different from the first resource scheduling assignment, and the step of transmitting, by the ground station, the second resource scheduling assignment to the second satellite in response to receiving the first resource scheduling assignment comprises:
- determining, by the ground station, a first priority of the second resource scheduling assignment and at least one priority of at least one resource scheduling assignment, wherein the at least one resource scheduling assignment comprises the first resource scheduling assignment; and
- selecting, by the ground station, to transmit the second resource scheduling assignment to the second satellite in response to the first priority being higher than the at least one priority.

28. The method according to claim 26, further comprising:
- measuring network parameters of the service area by the ground station; and
- generating the at least one resource scheduling assignment by the ground station according to the network parameters.

29. The method according to claim 19, wherein the second resource scheduling assignment comprises at least one of the following: radio resource scheduling, traffic scheduling, or service resource control.

30. A satellite for managing radio resources of a non-terrestrial network, comprising:
- a transceiver; and
- a processor, coupled to the transceiver, wherein the processor is configured to:
- receive a first resource scheduling assignment from a second satellite through the transceiver in response to entering a service area of the non-terrestrial network; and
- access the radio resources through the transceiver according to the first resource scheduling assignment.

31. A ground station for managing radio resources of a non-terrestrial network, comprising:
- a transceiver; and
- a processor, coupled to the transceiver, wherein the processor is configured to:
- receive, through the transceiver, a first resource scheduling assignment from a first satellite which leaves a service area of the non-terrestrial network; and
- transmit, through the transceiver, a second resource scheduling assignment to a second satellite which enters the service area according to the first resource scheduling assignment.

32. A satellite communication system for managing radio resources of a non-terrestrial network, comprising:
- a first satellite, transmitting a first resource scheduling assignment when leaving a service area of the non-terrestrial network; and
- a second satellite, communicatively connected to the first satellite, wherein the second satellite receives a second resource scheduling assignment corresponding to the first resource scheduling assignment when entering the service area, and accesses the radio resources according to the second resource scheduling assignment.

* * * * *